United States Patent [19]
Goering et al.

[11] 3,925,971
[45] Dec. 16, 1975

[54] GAUGING APPARATUS FOR IMPLEMENT HEAD

[75] Inventors: Lowell J. Goering, Moundridge; Ferol S. Fell, Newton, both of Kans.

[73] Assignee: Hesston Corporation, Hesston, Kans.

[22] Filed: Mar. 15, 1974

[21] Appl. No.: 451,365

[52] U.S. Cl. .................................... 56/208; 56/15.8
[51] Int. Cl.² ........................................... A01D 67/00
[58] Field of Search .......... 56/208, 10.2, 10.4, 15.8, 56/15.9, 16.1, DIG. 15

[56] References Cited
UNITED STATES PATENTS

| | | | |
|---|---|---|---|
| 2,135,621 | 11/1938 | Millard | 56/208 |
| 2,955,813 | 10/1960 | Hume | 56/208 X |
| 2,971,316 | 2/1961 | Popandopulo | 56/208 |
| 3,555,795 | 1/1971 | Hume et al. | 56/208 |

*Primary Examiner*—J. N. Eskovitz
*Attorney, Agent, or Firm*—Schmidt, Johnson, Hovey & Williams

[57] ABSTRACT

The main frame of a mobile implement has a pair of laterally spaced apart skid shoes that are disposed forwardly of the frame and are swingably mounted on the latter at a point spaced rearwardly from the front of the frame so that the shoes ride along the ground and move up and down as uneven terrain is encountered. The shoes underlie and have a force-transmitting connection with a crop head of the implement that is swingably mounted on the frame for movement about its own swinging axis separate from that of the shoes. While the head is disposed to swing about a relatively short radius, the skids are disposed to swing about a substantially longer radius, independently of the head, so that variations in the terrain are smoothly and easily accomodated by the skids while transmitting movement to the head so that the latter is shifted in a direction to compensate for such variations. Resistance forces applied against the skids when the latter encounter obstructions or sharp rises in the terrain are thus transmitted directly to the frame of the implement rather than to the head so that any tendency for the latter to experience "digging in" and to slam downwardly and rearwardly against the frame as a result of meeting such obstructions is substantially eliminated.

3 Claims, 5 Drawing Figures

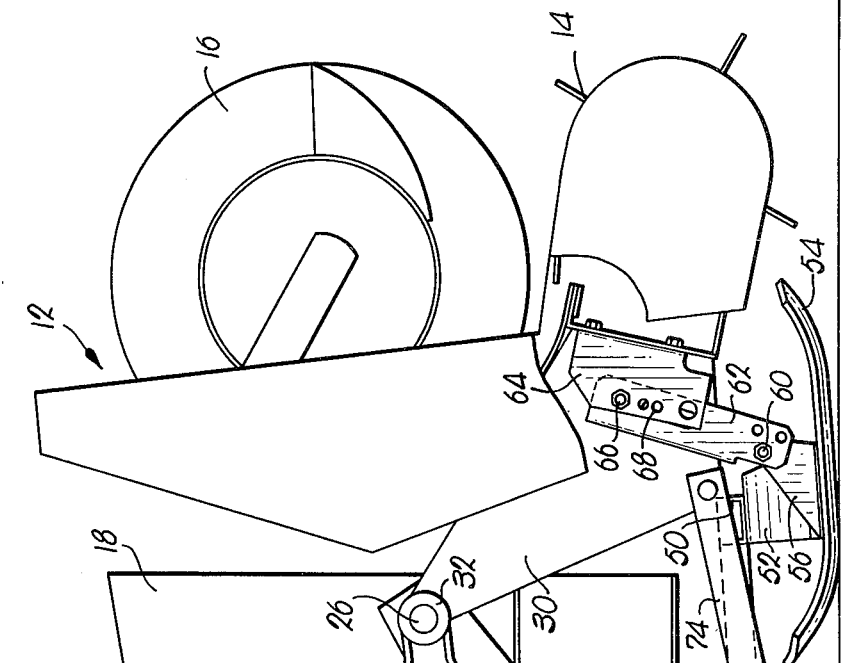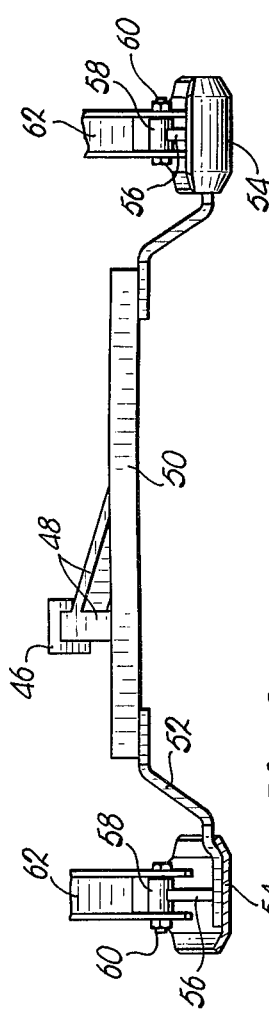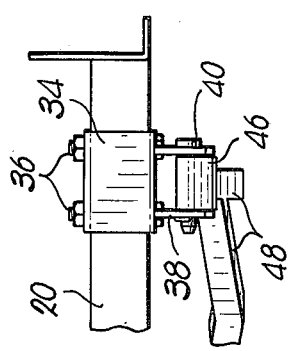

GAUGING APPARATUS FOR IMPLEMENT HEAD

This invention relates to eliminating the tendency of skid-supported implement heads which swing about relatively short radii to dig abruptly into an obstruction and slam violently downwardly and rearwardly against the frame of the implement instead of riding smoothly over the top of the obstruction.

While the ability of such heads to swing relative to their supporting frames is quite necessary in order to compensate for uneven terrain experienced by the head and the remainder of the implement, where the axis of swinging movement of the head is located but a short distance rearwardly from the head and is elevated to an extent, obstructions encountered by skid shoes beneath the head tend to drive the head down and under, in some instances, in a buckling or digging in action because the rearwardly directed forces from such obstructions are disposed almost tangentially of the swinging arc of the head. Instead of riding easily up and over such obstructions, as is the intended goal, the skid shoes may dig in abruptly and somewhat violently slam against the implement frame, leading to serious damage problems.

Accordingly, the primary object of the present invention is to eliminate such undesirable buckling under or digging in tendencies of implement heads having relatively short radii of swinging movement while at the same time retaining the use of underlying gauging apparatus such as skid shoes for at least partially supporting the load of the head as the implement is advanced across the field.

Pursuant to the foregoing, an important object of this invention is to direct resistive forces applied against the skids or other apparatus rearwardly to the main frame of the implement for absorption thereby rather than to the head as in the conventional arrangement.

Another important object of the invention is to make the skid shoes and the head swingable independently of one another about separate, spaced apart axes but with a force-transmitting connection between the shoes and the head so that while obstructive forces encountered by the shoes are transmitted rearwardly to the frame, vertical movement of the shoes as they ride over such obstructions is transmitted to the head to simultaneously move the latter in a direction appropriate to compensate for unevenness of the terrain.

An additional important object of this invention is to provide for such special independent yet cooperating action of the skids and the head without interferring in any way with other floatation apparatus of the implement which can be used in conjunction with the skids to share the load of the head.

In the drawings:

FIg. 1 is a partially broken away, side elevational view of an implement utilizing gauging apparatus constructed in accordance with the teachings of the present invention, the implement head and gauging apparatus being illustrated in a normal condition;

FIG. 2 is a fragmentary, rear elevational view of the frame of the implement showing the manner in which the support for the skid shoes is swingably mounted on the frame;

FIG. 3 is a front elevational view of the skids, their common support, and portions of the connecting structure between the skids and the head;

Figure 5:
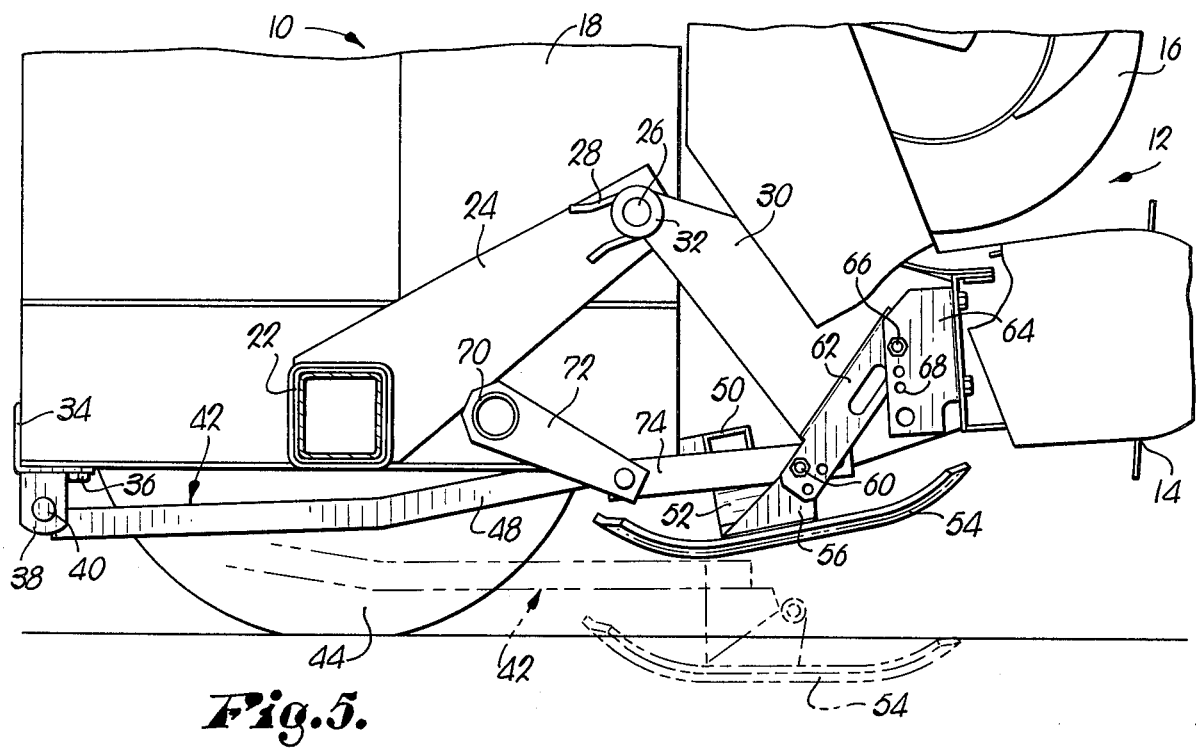
Figure 4:
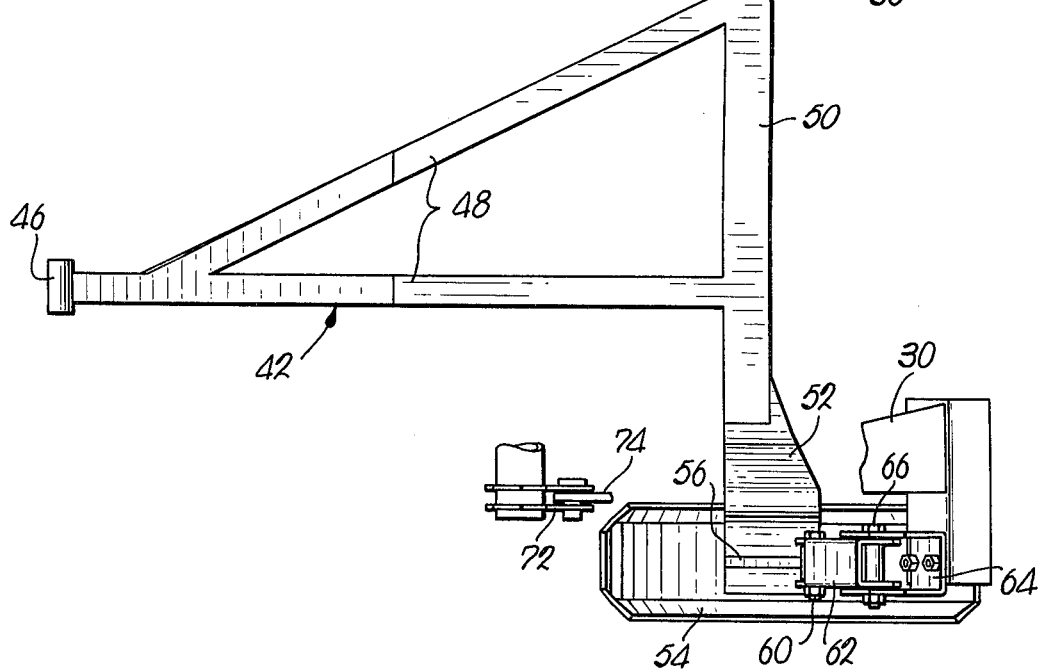

FIG. 4 is a top plan view of the gauging apparatus together with certain adjacent components of the head and the implement frame to reveal structural relationships therebetween; and FIG. 5 is a fragmentary, side elevational view similar to FIg. 1 showing the apparatus and head in a raised condition in solid lines and showing the apparatus lowered in broken lines in order to illustrate the action which occurs during vertical swinging of the skids and the head.

The implement 10 selected for illustrative purposes only is in the nature of a forage harvester having a crop head 12 provided with pickup means 14, here illustrated as being of the window pickup type, and an auger 16 disposed above and behind pickup 14 for accepting the crop from the latter, moving it laterally toward the center of head 12, and then discharging it rearwardly into a housing 18 of implement 10 for subsequent chopping in housing 18 and delivery through a spout not shown to an adjacent vehicle. As will become apparent, the principles of the present invention are not limited to the particular type of machine embodied by implement 10 nor to the particular type of attachment embodied by the head 12.

The implement 10 has a main frame that includes a rear crossbeam 20, a forward crossbeam 22, and a pair of inclined, generally fore-and-aft extending massive arms 24 (one only being shown) mounted on crossbeam 22 on opposite sides of housing 18. Each arm 24 has a horizontally projecting pintle 26 at its forwardmost end that swingably receives the rearwardly opening yoke 28 at the uppermost, rear end of a proximal support arm 30 on head 12. A generally vertically disposed retaining pin (not shown) extends through the furcations of yoke 28 to maintain pintle 26 seated deeply within the latter, and a retaining disc 32 on the outer end of each pintle 26 retains the corresponding yoke 28 against lateral displacement along the pintle 26.

As illustrated best in FIGS. 1 and 2, the rear crossbeam 20 has a generally U-shaped bracket 34 clamped thereon at the right end thereof (viewing FIG. 2) by bolts 36, and a pair of downwardly projecting ears 38 on bracket 34 carry a pivot pin 40 therebetween. A basically triangular-shaped (FIG. 4) support 42 extends fore-and-aft along the bottom of housing 18 between the ground-engaging wheels 44 thereof (one only being shown) and has a loop 46 at its rearmost end through which the pin 40 extends whereby to adapt the support 42 for vertical swinging movement about a horizontal axis through pin 40.

The support 42 has a pair of forwardly diverging legs 48 which terminate forwardly of the housing 18 at a common crossbar 50 which spans the two legs 48. A pair of formed, planer mounts 52 extend outwardly and downwardly from opposite ends of crossbar 50, and an elongated, fore-and-aft extending skid shoe 54, having upturned front and rear ends and sides, is secured to the outermost end of each mount 52. Thus, the shoes 54 are swingable with support 42 about an axis through pin 46 which, manifestly, is separate and apart from the axis of swinging movement of head 12 defined by the pintles 26 disposed substantially forwardly of and above the pin 46.

Each skid shoe 54 has a short, triangular-shaped upright 56 disposed centrally thereof on the mount 52 that carries a horizontally extending pivot tube 58 (FIG. 3) at its uppermost end which receives a pivot bolt 60 extending between opposed flanges of structure in the nature of a rigid, U-shaped link 62. At its opposite end, each link 62 is similarly pivotally coupled with an inversely U-shaped mounting piece 64 rigidly affixed to the framework of head 12. The pivotal coupling of each link 62 with a corresponding mounting piece 64 is made through a pivot bolt 66 disposed in any one of a series of holes 68 in piece 64, the hole 68 selected being determined by the height desired between pickup 14 and skid shoes 54 as is readily apparent.

Thus, a four-point linkage relationship is established between the arms 30 of head 12, the links 62, and support 42 of skids 54 having pivot points at pintles 26, bolts 66, bolts 60, and pin 40. The pintles 26 and bolts 66 form the upper two points of the linkage relationship, while the pin 40 and bolts 60 form the lower two points of such relationship. As illustrated, the point defined by the pintles 26 is located between and above the points defined by pin 40 and bolts 60, while the point defined by bolts 66 is located forwardly beyond the remaining points defined by pintles 26, bolts 60 and pin 40.

Accordingly, the four-point linkage that is created expands and contracts as it is lowered and raised respectively between extreme positions such as illustrated in FIG. 5 and, while skids 54 and head 12 swing independently of one another, they still move in unison.

FIG. 4 illustrates a torque tube 70 that extends across the implement 10 adjacent the front thereof and below arms 24. Although not shown in detail, it is to be understood that the tube 70 is rotatably supported by the frame of implement 10 and may be coupled with a fluid pressure piston and cylinder assembly (not shown) as well as with a flotation spring (also not shown). A pair of generally downwardly projecting crank arms 72 are affixed to the tube 70 on opposite sides of housing 18 which are in turn pivotally coupled with a pair of lifters 74 projecting forwardly therefrom and pivotally joined to the lower extremities of the arms 30 on head 12. In this manner, the head 12 may be forceably raised through the non-illustrated piston and cylinder assembly, torque tube 70, crank arms 72, and lifters 74 and, in addition, the non-illustrated flotation spring may be utilized through the same structure to floatingly support a share of the load of head 12 during field use. The remainder of such load will be borne by the skid shoes 54 through the links 62.

In use the flotation spring may be so adjusted that the skid shoes 54 only lightly engage the ground so that shoes 54 readily ride up and over would-be obstructions in the terrain as the implement 10 is advanced. In the event that an obstacle is encountered by shoes 54, their natural tendency is, as aforementioned, simply to ride over such obstacle, swinging the support 42 about the rear axis at pin 40 and transmitting a lifting force to the head 12 through links 62 to swing head 12 upwardly about its own axis through pintles 26. Such a condition is illustrated in an exaggerated manner by solid lines in FIG. 5, and a similar, although opposite, action takes place when the shoes 54 encounter a depression, whereupon they swing downwardly as illustrated in broken lines in FIG. 5 bringing therewith the head 12.

In the event that an obstacle is encountered by the leading edges of skids 54 which applies a relatively forceful load rearwardly against skid shoes 54, such load is transmitted to the crossbeam 20 of the main frame of implement 10 through support 42, rather than being directed to the head 12. Accordingly, there is virtually no tendency at all for the head 12 to buckle under about its swinging axis at pintles 26 and dig into the soil or slam violently against the implement frame as might be the case if skid shoes 54 were rigid to head 12 and swung about the same axis therewith. In this manner, therefore, destructive forces which might otherwise be applied against the head 12 when stubborn obstacles are encountered by skid shoes 54 are effectively "re-routed" to bypass head 12 and exert harmlessly against crossbeam 20 through support 42 and pin 46.

Having thus described the invention, what is claimed as new and desired to be secured by Letters Patent is:

1. In an implement having a mobile main frame and a crop head attached to said frame for vertical swinging movement relative thereto about a first generally horizontal axis, gauging apparatus at least partially supporting said head and comprising:
   a pair of laterally spaced apart ground engaging members mounted on said main frame for swinging movement independently of said head about a second axis in response to rises and falls in the terrain, said second axis being generally horizontal and being spaced rearwardly from said first axis; and
   structure disposed between said members and the head for transmitting vertical motion from said members to the head as terrain variations are encountered whereby to shift the head in a direction to compensate for such variations,
   said members having a common support frame extending rearwardly therefrom and said support frame having a single pivotal coupling with said main frame at said second axis,
   said support frame including a transversely extending, rigid crossbar fixed at its opposite ends to said members and a pair of rigid, rearwardly extending legs leading from said crossbar at longitudinally spaced locations thereon,
   said single pivotal coupling of the support frame with the main frame being adjacent the rearmost ends of said legs and being spaced inwardly from said ground engaging members.

2. Gauging apparatus as claimed in claim 1, wherein said members are disposed beneath said head.

3. Gauging apparatus as claimed in claim 1, wherein said structure has a lower pivotal connection with said members and an upper pivotal connection with said head, the distance between said lower pivotal connection and said pivotal coupling being substantially greater than the distance between said upper pivotal connection and said first axis.

* * * * *